United States Patent [19]

Billenstein et al.

[11] Patent Number: 4,474,682

[45] Date of Patent: Oct. 2, 1984

[54] PETROLEUM EMULSION-BREAKERS CONTAINING NITROGEN, AND THEIR USE

[75] Inventors: Siegfried Billenstein; Fritz J. Gohlke, both of Burgkirchen, Fed. Rep. of Germany

[73] Assignee: Hoechst Aktiengesellschaft, Fed. Rep. of Germany

[21] Appl. No.: 507,122

[22] Filed: Jun. 23, 1983

[30] Foreign Application Priority Data

Jun. 25, 1982 [DE] Fed. Rep. of Germany ....... 3223692

[51] Int. Cl.$^3$ ...................... B01D 17/04; C08L 61/14
[52] U.S. Cl. .................................. 252/344; 252/358; 525/504; 525/523
[58] Field of Search .................. 525/504, 507, 523; 252/344, 358

[56] References Cited

U.S. PATENT DOCUMENTS 2,743,254  4/1956  De Groote .......................... 525/503
4,117,031  9/1978  Macenka et al. .................... 525/507

*Primary Examiner*—Theodore E. Pertilla
*Attorney, Agent, or Firm*—Connolly and Hutz

[57] ABSTRACT

The new petroleum breakers are obtained by reacting, at 90° to 160° C. and at a pH value of 6 to 9, (a) an addition product which has been obtained by reacting phenol with formaldehyde or acetaldehyde in a molar ratio of 1:1 to 3 at a temperature of 50° to 80° C., in the presence of an alkaline catalyst, with (b) a block polymer which contains nitrogen and which has been obtained by an addition reaction in which 10 to 80 moles of ethylene oxide and propylene oxide are added on, as a statistical average per nitrogen atom, the molar ratio of ethylene oxide to propylene oxide being 1:0.5 to 14, to ethylenediamine, propylenediamine, polyethylenepolyamines, polypropyleneamines or mixtures thereof, the ratio being 1 to 20 moles of (a) to 1 mole of (b). They are distinguished by a high degree of effectiveness when used for separating petroleum emulsions. Products which in some cases have an even greater effect are obtained if the reaction product of (a) and (b) is propoxylated.

11 Claims, No Drawings

PETROLEUM EMULSION-BREAKERS CONTAINING NITROGEN, AND THEIR USE

The invention relates to new petroleum emulsion-breakers containing nitrogen. It also relates to a process for separating petroleum emulsions, particularly those of the water-in-oil type, using the new breakers.

Compounds containing nitrogen have already been recommended for use as petroleum emulsion-breakers. Thus nitrogen-containing demulsifiers for petroleum emulsions of the water-in-oil type are described in U.S. Pat. Nos. 2,552,530 and 2,552,531, in German Offenlegungsschriften Nos. 2,227,546 and 2,435,713 and in East German Pat. No. 150,474. These are, inter alia, ethoxylated and propoxylated polyethylenepolyamines which are obtained by reacting triethylenetetramine, tetraethylenepentamine, pentaethylenehexamine and the like with ethylene oxide and propylene oxide.

Petroleum emulsion-breakers containing nitrogen are also described in German Offenlegungsschrift No. 3,017,198. These breakers are partly alkylated polyethylenepolyamines.

A mixture comprising 25 to 75% by weight of an ethoxylated and/or propoxylated isoalkylphenol/formaldehyde resin and 25 to 75% by weight of an ethoxylated and/or propoxylated polyethylenepolyamine is employed, in accordance with German Offenlegungsschrift No. 2,719,978, for breaking crude oil emulsions.

Amongst the petroleum breakers which do not contain nitrogen, certain etherified phenol/aldehyde condensation products are recommended in German Pat. No. 2,445,873 and in the corresponding U.S. Pat. No. 4,117,031. These products are obtained by a condensation reaction, after prior neutralization at 80° to 150° C., of (a) an addition product which has been obtained by reacting aliphatic aldehydes with phenol in a molar ratio of 1:1 to 3:1 at temperatures of 50° to 80° C. in the presence of an alkaline catalyst, and (b) a block polymer which has been prepared by reacting polypropylene glycols having molecular weights of 1,500 to 2,500 with 30 to 50% by weight of ethylene oxide in the presence of alkaline catalysts, in a ratio of 0.5 to 4 moles of (a) to 1 mole of (b), and removing the water of reaction which is formed.

The known petroleum breakers, both those containing nitrogen and those not containing nitrogen, in either case only meet the present requirements in part. Either there is spontaneous initial breaking and the total separation is too poor and the removal of salt moderate, or the breaking process proceeds too slowly although the separation of salt and water is good. Occasionally, their use is also linked to specific varieties of oil, or it is necessary to use relatively large quantities, or they are only effective at elevated temperatures.

The object of the present invention is, therefore, to provide new petroleum emulsion-breakers which do not have the abovementioned drawbacks and, in particular, independently of the nature and composition of the crude oil, have a very short separation time even at a low treatment temperature, a high effectiveness even when a small quantity is used, and a corrosion-inhibiting action towards metallic materials.

It has been found, surprisingly, that reaction products formed from (a) an addition product of an aldehyde with a phenol and (b) an ethoxylated and propoxylated alkylenediamine or polyalkylenepolyamine constitute petroleum breakers which possess, to an unexpectedly high extent, the abovementioned important properties in respect of separation time and effectiveness and, at the same time, also have a relatively good corrosion-inhibiting action.

The petroleum emulsion-breakers according to the invention are prepared by reacting, at 90° to 160° C. and at a pH value of 6 to 9,
(a) an addition product which has been obtained by reacting phenol with formaldehyde or acetaldehyde in a molar ratio of 1:1 to 3 at a temperature of 50° to 80° C., in the presence of an alkaline catalyst, with
(b) a block polymer which contains nitrogen and which has been obtained by an addition reaction in which 10 to 80 moles of ethylene oxide and propylene oxide are added on, as a statistical average per nitrogen atom, the molar ratio of ethylene oxide to propylene oxide being 1:0.5 to 14, to ethylenediamine, propylenediamine, polyethylenepolyamines, polypropylenepolyamines or mixtures thereof,
the ratio being 1 to 20 moles of (a) and 1 mole of (b).

It has also been found that the properties of the reaction product according to the invention are improved further if it is reacted with propylene oxide.

The addition products according to component (a) are obtained by the addition reaction, which is known per se, of formaldehyde or acetaldehyde with phenol under the conditions mentioned. Within the scope of the present invention it is preferable to employ formaldehyde, advantageously in the form of a 35% strength by weight aqueous solution of formaldehyde or in the form of paraformaldehyde. The molar ratio of phenol to aldehyde is preferably 1:1.8 to 2.2. The reaction temperature of 50° to 80° C., preferably 55° to 70° C., in combination with the alkaline catalysis, ensures that the aldehyde is added onto the phenol. Examples of suitable alkaline catalysts are sodium hydroxide, sodium alcoholates, such as sodium methylate, sodium carbonate, calcium hydroxide and the corresponding potassium compounds and also tertiary amines, such as triethylamine, sodium hydroxide, potassium hydroxide and sodium alcoholates being preferred. The amount of alkaline catalyst is generally 0.5 to 10% by weight, preferably 1 to 5% by weight, relative to the amount of phenol employed. The addition products (a) are described in the German patent quoted, No. 2,445,873, and in the U.S. patent quoted, U.S. Pat. No. 4,117,031. As a rule, they are brown, slightly viscous, clear liquids which are readily soluble in water.

The nitrogen-containing block polymers according to component (b) are obtained by the addition reaction, which is known per se, of ethylene oxide and propylene oxide (oxalkylation) with the alkyleneamines mentioned. In this reaction, 10 to 80 moles, preferably 30 to 70 moles, of ethylene oxide and propylene oxide are added on, as a statistical average per nitrogen atom, the ratio of ethylene oxide to propylene oxide being 1:0.5 to 14, preferably 1:1 to 8. Alkyleneamines which are suitable in accordance with the invention are ethylenediamine, propylenediamine, polyethylenepolyamines, polypropylenepolyamines or mixtures thereof. In general, the polyamines contain 3 to 200 nitrogen atoms, preferably 3 to 100 nitrogen atoms, per molecule. Preferred alkyleneamines are ethylenediamine, propylenediamine, diethylenetriamine, triethylenetetramine, tetraethylenepentamine, the corresponding propyleneamines and the higher polyethylenepolyamines having a dynamic viscosity of up to 20,000 mPa s, determined on a 50% strength by weight aqueous solution at 20° C. Examples of polyethylenepolyamines of this type are the products of BASF Aktiengesellschaft which are known under the name "Polymin", such as Polymin G35, Polymin HS and Polymin P. Ethylenediamine, propylenediamine, diethylenetriamine, triethylenetetramine, tetraethylenepentamine and the corresponding propyleneamines are particularly preferred.

The oxalkylation of the alkyleneamines mentioned is carried out at a temperature of 80 to 160, preferably 110 to 150, °C., in the presence of alkaline catalysts; a pressure of about 30 to 600 kPa is set up. In this reaction, the ethylene oxide and the propylene oxide can be employed successively by first adding on the ethylene oxide and then the propylene oxide or by first adding on the propylene oxide and then the ethylene oxide. It is also possible to employ a mixture of the two alkylene oxides. It is preferable to employ the two alkylene oxides successively. In this case it is preferable to employ first propylene oxide and then ethylene oxide. Suitable alkaline catalysts are sodium hydroxide, sodium alcoholates, such as sodium methylate, sodium carbonate and the corresponding potassium compounds, sodium hydroxide and potassium hydroxide being preferred. In general, the amount of catalyst is 5 to 40% by weight, preferably 10 to 30% by weight, relative to the amount of alkyleneamine employed. The oxalkylation can be carried out in a single stage or in several, preferably 3, stages, the multi-stage procedure being preferred. In this procedure the method generally adopted is to react, in the first stage, the alkyleneamine, which is initially present in a pressure vessel equipped with a stirrer, at a temperature of 100° to 150° C., in the absence of a catalyst, with a molar amount of ethylene oxide or propylene oxide corresponding to the hydrogen atoms attached to nitrogen in the alkyleneamine. After the alkaline catalyst has been added, the remaining ethylene oxide or propylene oxide, depending on which alkylene oxide was used at the beginning, is caused to undergo an addition reaction in a second stage at a temperature of 110° to 150° C. When the desired amount of one of the two alkylene oxides has undergone the addition reaction, the second alkylene oxide is caused to undergo an addition reaction in a third stage, also at a temperature of 110° to 150° C. The pressure during the reactions in the three stages is generally about 50 to 600 kPa. The single-stage procedure in which the two alkylene oxides are caused to undergo an addition reaction simultaneously, is generally carried out by reacting the alkyleneamine with a mixture of ethylene oxide and propylene oxide in the amounts indicated above, in the presence of an alkaline catalyst and at a temperature of 110° to 150° C.

The nitrogen-containing block polymers according to component (b) are, as a rule, slightly viscous to semisolid, pale yellow products under normal conditions.

The petroleum breakers according to the invention are prepared by subjecting the addition reaction product (a) to a condensation reaction with the nitrogen-containing block polymer (b) in a ratio of 1 to 20 moles, preferably 1 to 16 moles, of (a) to 1 mole of (b), at 90° to 160° C., preferably 100° to 150° C., and at a pH value of 6 to 9, preferably 6.5 to 8.5, and removing the water of reaction which is formed (the pH value of the mixture of (a) and (b) is determined on a 1% strength by weight aqueous solution). Since the components (a) and (b) are, as a rule, alkaline, the pH value indicated is adjusted by adding an appropriate amount of an acid. It is possible to use inorganic or organic acids. Examples of suitable acids are hydrogen halide acids, such as hydrochloric acid and hydrobromic acid, phosphoric acids, sulfuric acid, carboxylic acids, such as acetic acid and propionic acid, sulfonic acids, such as paratoluenesulfonic acid and dodecylbenzenesulfonic acid, halogenoacetic acids, such as trichloroacetic acid and trifluoroacetic acid, and mixtures thereof. Phosphoric acid, sulfuric acid, paratoluenesulfonic acid and dodecylbenzenesulfonic acid or mixtures thereof are preferred. The components (a) and (b) can be employed as such or dissolved in a solvent. It is advantageous to heat them to the temperature indicated, while stirring, and to keep them at this temperature, while removing the water continuously. The reaction (condensation) is carried on until no further water of reaction, or virtually none, is formed. In general, this is the case after up to 15 hours, depending on the reaction temperature and the level of the vacuum. It is advantageous to remove the water with the assistance of a vacuum or by distillation under entraining or azeotropic conditions, using an organic solvent. Examples of suitable organic solvents are toluene, xylene, higher-boiling aromatics or mixtures thereof. The preferred organic solvent is xylene. The amount of solvent can vary within wide limits.

The detailed preparation of the petroleum breakers according to the invention is preferably effected in accordance with one of the two following procedures:

In accordance with the first procedure, the components (a) and (b) are initially taken in a reaction vessel, mixed by stirring, adjusted to the pH value indicated and heated to 100° to 130° C., while stirring. A vacuum (waterpump vacuum) is then applied in order to remove the water and the mixture is maintained at this temperature, while stirring, until no further quantity, or appreciable quantity, of water of reaction is formed. This is the case, as a rule, after 10 to 15 hours. The second preferred procedure follows the course of the first initially, and the mixture is heated similarly to 100° to 130° C., while stirring. A vacuum (waterpump vacuum) is then applied in order to remove the water and the mixture is maintained for 3 to 8 hours at the temperature of 100° to 130° C. The reaction product is then taken up in one of the abovementioned organic solvents, preferably in xylene, (to give a solution of about 30 to 60% by weight) and the solution is boiled for 5 to 10 hours at a temperature of 140° to 150° C. while removing the further water of the reaction from the system by means of the organic solvent.

The reaction, according to the invention, of the reaction product (condensation product) of the components (a) and (b) with propylene oxide (oxpropylation) can be carried out in one or more stages. It is preferably carried out in one stage. In principle, this oxpropylation (supplementary oxpropylation) is carried out under the same conditions as the oxethylation and oxpropylation employed for preparing the component (b). In general, the procedure followed is initially to take the condensation product formed from the components (a) and (b), advantageously in the form of a solution in toluene, xylene, higher-boiling aromatics or mixtures thereof, for example in a 50% strength by weight solution in xylene, in a pressure vessel equipped with a stirrer, and (after flushing the gas space with nitrogen) to add one of the abovementioned alkaline catalysts. In general, the amount of catalyst is 0.5 to 3% by weight, preferably 1 to 2% by weight, relative to the weight of the condensation product employed. The mixture is heated, while stirring, and any water introduced by the catalyst is removed from the system at the reflux temperature of about 140° to 160° C. which is set up. An addition reaction is then carried out with propylene oxide at a temperature of 100° to 140° C., preferably 110° to 130° C. The pressure during the oxpropylation reaction is about 50 to 600 kPa. The end of the reaction can be recognized from the fall in the pressure. The amount of propylene oxide employed for the oxpropylation, according to the invention, of the reaction product formed from the components (a) and (b) is generally 10 to 200 g, preferably 20 to 100 g, per 100 g of reaction product employed.

The petroleum breakers according to the invention are yellow to brown liquids of varying viscosity which are soluble in organic solvents, for example in xylene. The new petroleum breakers are suitable, with particular advantage, for breaking petroleum emulsions of the water-in-oil type. In petroleum treatment plants, the water-in-oil emulsions are warmed to 40° to 70° C., depending on their viscosity, and are brought to the acceptance specifications of the refineries by adding suitable demulsifiers (breakers) or by means of a combined electrical-chemical procedure. Owing to the current demand for savings in energy, increasing attempts are made to reduce the treatment temperatures customary at the present time. However, the consequence of a low treatment temperature is that a relatively large amount of the known types of breaker has to be metered in. Now it is a fact that the effectiveness of a demulsifier in an emulsion is linked with a specific maximum quantity. If this quantity is exceeded, i.e. if too much demulsifier is added, the effectiveness falls (so-called overtreatment), that is to say only a part of the water phase or even no further water phase separates out. It has also been shown that, using the known types of breaker, the separation of the oil-field water does not take place fast enough and therefore a content of residual water or residual emulsion which is still too great is present in the oil to be pumped. Compared with the known crude oil breakers, the crude oil breakers according to the invention exhibit an unexpectedly rapid action which takes place at temperatures as low as that of the freshly extracted emulsions (20° to 40° C.) at such a rate that these emulsions are already substantially broken in the intake lines of the treatment plants. An additional advantageous side-effect is that they lead to a marked reduction in the pressure in the collecting lines. They also have a corrosion-inhibiting effect, which constitutes a further substantial advantage. The new breakers are, therefore, particularly distinguished by the fact that they produce crude oils meeting the acceptance specification after a short separation time, even at low treatment temperatures, and that only a relatively small quantity is required for this purpose. The quantities of the breakers according to the invention to be used can vary within wide limits. They depend, in particular, on the nature of the crude petroleum emulsion, the treatment temperature and the nature of the mechanical/physical treatment plant. In general, the effective quantity is 5 to 100 g per ton(metric), preferably 10 to 50 g per ton(metric). In order to achieve better metering and ease of distribution in the crude petroleum emulsion, the new breakers are preferably employed in solution. Suitable solvents are water or organic solvents, such as alcohols, for example methanol, isopropanol and butanol, aromatic hydrocarbons, for example toluene and xylene, and commercially available mixtures of higher aromatics.

The invention will now be illustrated in greater detail by means of examples.

PREPARATION OF THE PETROLEUM BREAKERS ACCORDING TO THE INVENTION

EXAMPLE 1

Phenol/aldehyde addition product (component a)

376 g (4 moles) of phenol and 12 g of a 50% strength by weight aqueous sodium hydroxide solution (i.e. 1.6% by weight of sodium hydroxide, relative to phenol) are initially placed in a reaction vessel and are heated to 50° to 55° C., while stirring. 686 g of a 35% strength by weight aqueous solution of formaldehyde (i.e. 8 moles of formaldehyde) are metered in at this temperature, while stirring, in the course of about 1 hour. When the addition of formaldehyde is complete, stirring is continued for a further 6 hours at 70° C., until the content of free formaldehyde is less than 3% by weight. An approximately 58% strength by weight aqueous, brown solution of the reaction product (dimethylolphenol solution) is present. It constitutes the component (a).

Nitrogen-containing block polymer (component b)

120 g (2 moles) of ethylenediamine are initially placed in a reaction vessel and are heated to 120° to 130° C., while stirring. 352 g (8 moles) of ethylene oxide are metered in at this temperature and under a pressure of 100 to 400 kPa, while stirring. The end of the reaction (ethylene oxide addition reaction) is recognised by the fact that the pressure falls to less than 100 kPa. 11 g of caustic potash (i.e. 9.2% by weight, relative to ethylene diamine) are now introduced, as the catalyst. After the contents of the reaction vessel have been dried at a temperature of about 90° C. with the aid of a vacuum of about 2 kPa, the mixture is heated to 130° to 150° C., while stirring, after which a further 2,330 g (52.9 moles) of ethylene oxide are metered in at this temperature and under a pressure of 100 to 500 kPa. When the addition of ethylene oxide is complete, 8,200 g (141.4 moles) of propylene oxide are metered in, in turn, at a temperature of 120° to 130° C. and under a pressure of 50 to 400 kPa, while stirring. The end of the propylene oxide addition reaction is recognized by the fact that the pressure falls to less than 40 kPa. (The molar ratio of ethylene oxide to propylene oxide is 1:2.3; the total epoxide corresponds as a statistical average, to 50 moles per nitrogen atom.) A clear, yellow, slightly viscous liquid is present as the reaction product. It constitutes the component (b).

Product according to the invention 26.6 g (0.1 mole) of the component (a) and 130 g (0.025 mole) of the component (b) are initially placed in a reaction vessel (the molar ratio of (a) to (b) is 4:1), the pH is adjusted to a value of 6.4 by adding phosphoric acid, while stirring, and the mixture is heated to 120° C., after which a waterpump vacuum (i.e. about 2,000 Pa) is applied and is maintained at this temperature for 4 hours, while stirring, in order to remove the water. 140 g of xylene are then added to the contents of the reaction vessel, which are boiled for 10 hours at 145° C. while the further water of reaction is removed from the system by means of the xylene. The petroleum breaker according to the invention is present in the form of an approximately 50% strength by weight, brown xylene solution of medium viscosity.

EXAMPLE 2

53.2 g (0.2 mole) of the component (a) from Example 1 and 130 g (0.025 mole) of the component (b) from Example 1 are treated as in Example 1, with the difference that 155 g of xylene are added instead of 140 g (the molar ratio of (a) to (b) is 8:1). The petroleum breaker according to this example is also in the form of an approximately 50% strength by weight, red-brown xylene solution of medium viscosity.

EXAMPLE 3

Nitrogen-containing block polymer (component b)

60 g (1 mole) of ethylenediamine are initially placed in a reaction vessel and are heated to 120° to 130° C., while stirring. 232 g (4 moles) of propylene oxide are metered in at this temperature and under a pressure of 50 to 300 kPa, while stirring. The end of the reaction (propylene oxide addition reaction) is recognized by the fact that the pressure falls to less than 50 kPa. 18 g of caustic potash (i.e. 30% by weight, relative to ethylenediamine) are now introduced, as the catalyst. After the contents of the reaction vessel have been dried at a temperature of about 90° C. with the aid of a vacuum of about 2,000 Pa, the mixture is heated to 120° to 130° C., while stirring, after which a further 4,670 g (80.5 moles) of propylene oxide are metered in at this temperature and under a pressure of 50 to 400 kPa. When the addition of propylene oxide is complete, 1,240 g (28.2 moles) of ethylene oxide are metered in, in turn, at a temperature of 120° to 130° C. and under a pressure of 100 to 500 kPa, while stirring. The end of the ethylene oxide addition reaction is recognized by the fact that the pressure falls to less than 50 kPa. (The molar ratio of ethylene oxide to propylene oxide is 1:3; the total epoxide corresponds, as a statistical average, to 57 moles per nitrogen atom.) A clear, yellow, slightly viscous liquid is present as the reaction product. It constitutes the component (b).

Product according to the invention 53.2 g (0.2 mole) of the component (a) from Example 1 and 155 g (0.025 mole) of the component (b) are initially placed in a reaction vessel (the molar ratio of (a) to (b) is 8:1), the pH is adjusted to a value of 6.0 by adding phosphoric acid, while stirring, and the mixture is heated to 120° C., after which a waterpump vacuum is applied and is maintained for 4 hours at this temperature in order to remove the water. 180 g of xylene are now added to the contents of the reaction vessel and the mixture is boiled for 10 hours at 145° C., while the further water of reaction is removed from the system by means of the xylene. The petroleum breaker according to the invention is present in the form of an approximately 50% strength by weight, brown xylene solution of medium viscosity.

EXAMPLE 4

Component (a) from Example 1 and component (b) from Example 3, but 4,050 g (69.9 moles) of propylene oxide are metered in instead of the total of 4,902 g (84.5 moles) of propylene oxide and 726 g (16.5 moles) of ethylene oxide are metered in instead of the 1,240 g (28.2 moles) of ethylene oxide. (The molar ratio of ethylene oxide to propylene oxide is 1:4; the total epoxide corresponds, as a statistical average, to 43 moles per nitrogen atom.) 53.2 g (0.2 mole) of the component (a) and 121 g (0.025 mole) of the component (b) are initially placed in a reaction vessel (the molar ratio of (a) to (b) is 8:1), the pH is adjusted to a value of 6.0 by adding phosphoric acid, while stirring, and the mixture is heated to 120° C. The mixture is kept at this temperature and under a waterpump vacuum for 11 hours, while stirring, in order to remove the water. The breaker according to this example is a relatively viscous, red-brown liquid.

EXAMPLE 5

Component (a) from Example 1 and component (b) from Example 3, but 5,520 g (95.2 moles) of propylene oxide are metered in instead of the total of 4,902 g (84.5 moles) of propylene oxide and 616 g (14 moles) of ethylene oxide are metered in instead of the 1,240 g (28.2 moles) of ethylene oxide. (The molar ratio of ethylene oxide to propylene oxide is 1:7; the total epoxide corresponds to 55 moles per nitrogen atom.) 53.2 g (0.2 mole) of the component (a) and 155 g (0.025 mole) of the component (b) (the molar ratio of (a) to (b) is 8:1) are treated as in Example 4, with the difference that the pH is adjusted to a value of 6.8 with the phosphoric acid and the mixture is kept at 120° C. and under a waterpump vacuum for 10 hours. The breaker is a relatively viscous, brown liquid.

EXAMPLE 6

Component (a) from Example 1 and component (b) from Example 3, but 4,320 g (74.5 moles) of propylene oxide are metered in instead of the total of 4,902 g (84.5 moles) of propylene oxide and 490 g (11.1 moles) of ethylene oxide are metered in instead of the 1,240 g (28.2 moles) of ethylene oxide (molar ratio of ethylene oxide to propylene oxide=1:6.7; the total epoxide corresponds to 43 moles per nitrogen atom). 212 g (0.8 mole) of the component (a) and 490 g (0.1 mole) of the component (b) (the molar ratio of (a) to (b) is 8:1) are treated as in Example 4, with the difference that the pH is adjusted to a value of 8.2 by means of 16 g of dodecylbenzenesulfonic acid and the mixture is kept at a temperature of 100° C. and under a waterpump vacuum for 15 hours. The resulting breaker is a brown liquid of medium viscosity.

EXAMPLE 7

Component (a) from Example 1 and component (b) from Example 3, but 4,340 g (74.8 moles) of propylene oxide are metered in instead of the total of 4,900 g (84.5 moles) of propylene oxide and 1,150 g (26.1 moles) of ethylene oxide are metered in instead of the 1,240 g (28.2 moles) of ethylene oxide. (The molar ratio of ethylene oxide to propylene oxide is 1:2.9; the total epoxide corresponds, as a statistical average, to 50 moles per nitrogen atom.) 212 g (0.8 mole) of the component (a) and 555 g (0.1 mole) of the component (b) are initially placed in a reaction vessel (the molar ratio of (a) to (b) is 8:1), the pH is adjusted to a value of 8.1 by adding 16 g of dodecylbenzenesulfonic acid, while stirring, and the mixture is heated to 100° C. It is kept at this temperature and under a waterpump vacuum for 6 hours, while stirring, in order to remove the water. 690 g of xylene are now added to the contents of the reaction vessel, and the mixture is boiled for 10 hours at 145° C. while the further water of reaction is removed from the system by means of the xylene. A brown-violet, approximately 50% strength by weight xylene solution, of medium viscosity, of the breaker is present.

EXAMPLE 8

Component (a) from Example 1 and component (b) from Example 7

14.2 g (0.0536 mole) of the component (a) and 150 g (0.0268 mole) of the component (b) (the molar ratio of (a) to (b) is 2:1) are treated as in Example 6, with the exception that the pH is adjusted to a value of 8.3 by means of 2.8 g of dodecylbenzenesulfonic acid. The resulting breaker is a brown liquid of medium viscosity.

EXAMPLE 9

Component (a) from Example 1 and component (b) from Example 7

28.4 g (0.107 mole) of the component (a) and 150 g (0.0268 mole) of the component (b) (the molar ratio of (a) to (b) is 4:1) are treated as in Example 7, with the difference that 3.4 g of dodecylbenzenesulfonic acid are added in order to adjust the pH to a value of 8.1, the mixture is kept at 100° C. and under a waterpump vacuum for 12 hours, and 162 g of xylene are then added to the contents of the reaction vessel. The resulting breaker is present in the form of a brown, approximately 50% strength by weight xylene solution of medium viscosity.

EXAMPLE 10

Component (a) from Example 1 and component (b) from Example 7

56.8 g (0.214 mole) of the component (a) and 100 g (0.0178 mole) of the component (b) (the molar ratio of a) to (b) is 12:1) are treated as in Example 7, with the difference that 3.7 g of dodecylbenzenesulfonic acid are added in order to adjust the pH to a value of 8.1, the mixture is kept at 100° C. and under a waterpump vacuum for 3 hours, and 130 g of xylene are then added to the contents of the reaction vessel. The resulting breaker is present in the form of a violet, approximately 50% strength by weight xylene solution of medium viscosity.

EXAMPLE 11

Nitrogen-containing block polymer (component b)

94.5 g (0.50 mole) of tetraethylenepentamine are initially placed in a reaction vessel and 215 g (3.7 moles) of propylene oxide are metered in at 120° to 130° C. and under a pressure of 1 to 3 bar, while stirring. When the pressure has fallen to less than 50 kPa, 14 g of caustic potash (i.e. 15% by weight, relative to the polyamine) are introduced, as the catalyst. After the reaction mixture has been dried at 100° C. with the aid of a vacuum of about 2,000 Pa, it is heated to 120° to 130° C., while stirring. A further 4,190 g (72.2 moles) of propylene oxide are metered in at this temperature and under a pressure of 50 to 400 kPa. When the addition of the propylene oxide is complete, 700 g (15.9 moles) of ethylene oxide are metered in at a temperature of 130° to 150° C. and under a pressure of 100 to 400 kPa. (The molar ratio of ethylene oxide to propylene oxide is 1:4.8; as a statistical average, 37 moles of epoxide per nitrogen atom undergo the addition reaction.) When the ethylene oxide has reacted completely, a yellow, slightly viscous liquid is present.

Product according to the invention 10.6 g (0.04 mole) of the component (a) from Example 1 and 208 g (0.02 mole) of the component (b) are initially taken in a reaction vessel (the molar ratio of (a) to (b) is 2:1), the pH is adjusted to a value of 8.1 by adding 2.7 g of dodecylbenzenesulfonic acid, while stirring, and the mixture is heated to 100° C. The mixture is kept at this temperature and under a waterpump vacuum for 10 hours, while stirring. 214 g of xylene are then added, and the contents of the reaction vessel are boiled for 8 hours while removing the further water of reaction from the system by means of the xylene. A violet, approximately 50% strength by weight xylene solution, of medium viscosity, of the condensation product is present.

EXAMPLE 12

Component (a) from Example 1 and component (b) from Example 11

31.8 g (0.12 mole) of component (a) and 156 g (0.015 mole) of component (b) (the molar ratio of (a) to (b) is 8:1) are treated as in Example 11, with the difference that 3 g of dodecylbenzenesulfonic acid are used to adjust the pH value. The resulting breaker is a violet liquid of medium viscosity in a 50% strength by weight solution in xylene.

EXAMPLE 13

Component (a) from Example 1 and component (b) from Example 11

63.6 g of the component (a) (0.24 mole) and 156 g (0.015 mole) of the component (b) (molar ratio of (a) to (b) is 16:1) are treated as in Example 11, with the difference that 4.2 g of dodecylbenzenesulfonic acid are used to adjust the pH to a value of 8.3. The resulting breaker is present in the form of a violet, approximately 50% strength by weight xylene solution of medium viscosity.

EXAMPLE 14

Component (a) from Example 1 and component (b) from Example 11, but 4,400 g (100 moles) of ethylene oxide are metered in instead of the 700 g (15.9 moles), while the same quantity of propylene oxide, altogether 4,405 g (75.9 moles) is used. (The molar ratio of ethylene oxide to propylene oxide is 1:0.76; as a statistical average, 70 moles of epoxide per nitrogen atom have undergone the addition reaction.) 21.2 g (0.08 mole) of the component (a) and 180 g (0.01 mole) of the component (b) are initially placed in a reaction vessel (molar ratio of (a) to (b) is 8:1), and the pH is adjusted to a value of 7.8 by adding 1.9 g of dodecylbenzenesulfonic acid, while stirring, and the mixture is heated to 100° C. Stirring is continued at this temperature for 6 hours under a waterpump vacuum, 190 g of xylene are then added to the reaction mixture, and the latter is boiled for 12 hours while further water of reaction is removed from the system by means of xylene. This gives a brown, viscous, approximately 50% strength by weight solution in xylene of the condensation product.

EXAMPLE 15

Nitrogen-containing block polymer (component b)

65.5 g (0.50 mole) of dipropylenetriamine are initially placed in a reaction vessel and 145 g (2.5 moles) of propylene oxide are metered in at 120° to 130° C., while stirring. When the propylene oxide has reacted completely, 14 g of caustic potash (i.e. 21% by weight, relative to the polyamine) are introduced, as the catalyst, and the further treatment of the mixture is as in Example 11, with the difference that a further 3,300 g (56.9 moles) of propylene oxide and 870 g (19.8 moles) of ethylene oxide are metered in. (The molar ratio of ethylene oxide to propylene oxide is 1:3.0; as a statistical average, 53 moles of epoxide per nitrogen atom have undergone the addition reaction.)

Product according to the invention 42.4 g (0.16 mole) of the component (a) from Example 1 and 175 g (0.02 mole) of the component (b) (molar ratio of (a) to (b) is 8:1) are treated as in Example 11, with the difference that the pH is adjusted to a value of 8.5 by means of 4 g of dodecylbenzenesulfonic acid, and 195 g of xylene are added instead of 214 g of xylene. The resulting breaker is present in the form of a violet, 50% strength by weight xylene solution of medium viscosity.

EXAMPLE 16

(additional oxpropylation)

2.5 g of caustic potash are added to 500 g of the 50% strength by weight xylene solution of the condensation product from Example 7, after which the mixture is stirred for about 1 hour at the reflux temperature of about 145° C. in order to remove water. 63 g of propylene oxide (i.e. 25% by weight of propylene oxide, relative to the condensation product employed, or 25 g of propylene oxide per 100 g of condensation product) are then metered into the autoclave at 120° to 130° C. and under a pressure of 50 to 300 kPa, after carefully flushing the reaction space with nitrogen. When the propylene oxide has reacted completely as a result of further stirring at 120° to 130° C., a violet, homogeneous, approximately 55% strength by weight xylene solution is obtained as the end product.

EXAMPLE 17

(additional oxpropylation)

500 g of the condensation product from Example 7 are treated as in Example 16, with the difference that 166 g of propylene oxide (66% by weight of propylene oxide, relative to the condensation product employed) are metered in instead of 63 g of propylene oxide. The end product is obtained in the form of a 62% strength by weight xylene solution.

EXAMPLE 18

(additional oxpropylation)

1.8 g of caustic potash are added to 300 g of the 50% strength by weight xylene solution of the condensation product from Example 12. The further procedure is as in Example 16, with the difference that 135 g of propylene oxide (i.e. 90% by weight of propylene oxide, relative to the condensation product employed) are metered in. A brown-violet, homogeneous, approximately 65% strength by weight xylene solution is obtained as the end product.

EXAMPLE 19

Nitrogen-containing block polymer (component b)

91.5 g of the polyethylenepolyamine sold under the name Polymin G 35 by BASF Aktiengesellschaft (Federal Republic of Germany) are initially placed, in the form of an aqueous solution, in a pressure reaction vessel. 67 g (1.15 moles) of propylene oxide are metered in at 90° to 100° C. and under a pressure of 50 to 200 kPa, while stirring. When the propylene oxide has reacted completely, 4.6 g of caustic potash (i.e. 5% by weight, relative to the polyamine) are introduced, as the catalyst. After the reaction mixture has been dried at 100° C. with the aid of a waterpump vacuum, a further 1,450 g of propylene oxide (25.0 moles) are metered in at 120° to 140° C., while stirring. When the quantity of propylene oxide has reacted completely, 189 g (4.3 moles) of ethylene oxide are metered in at 120° to 140° C. (The molar ratio of ethylene oxide to propylene oxide is 1:6.1; the total epoxide corresponds, as a statistical average, to 30 moles per nitrogen atom.) A yellow liquid of medium viscosity is present.

Product according to the invention 80 g (0.30 mole) of the component (a) from Example 1 and 272 g of the component (b) are initially placed in a reaction vessel. The pH is adjusted to a value of 8.3 by adding 4.6 g of dodecylbenzenesulfonic acid, after which the mixture is heated to 100° C. It is stirred for 10 hours at this temperature and under a waterpump vacuum. A highly viscous, brown condensation product in solution in xylene is obtained.

The use of the compounds according to the invention as petroleum breakers

The following examples with several different crude oil emulsions show that the new petroleum breakers, compared with those according to the state of the art, have an unexpectedly high effectiveness, even at a low treatment temperature and in an amount which is substantially independent of the nature of the crude petroleum and relatively small in each case.

The percentages quoted in the examples are percentages by weight.

EXAMPLES 20 TO 21

Crude oil emulsion from the south German area
Water content: 51.50%.
Salinity: 0.76%.
Breaking temperature: 30° C.

| Type of breaker | Quantity employed ppm | % separation of water after | | | | | | | % of residual water in the topped oil |
|---|---|---|---|---|---|---|---|---|---|
| | | 10' | 20' | 30' | $1^h$ | $3^h$ | $6^h$ | $24^h$ | |
| (1) Crosslinked breaker according to German Patent 2,445,873 | 100 | 0 | 0 | 0 | 10 | 58 | 86 | 92 | 0.9 |
| (2) Breaker from Example 1 of the present application | 100 | 0 | 2 | 4 | 25 | 62 | 90 | 96 | 0.5 |
| (3) Breaker from Example 2 of the present application | 100 | 0 | 8 | 12 | 36 | 70 | 92 | 98 | 0.4 |
| Blank value | — | 0 | 0 | 0 | 0 | 0 | 0 | 2 | — |
| Breaking temperature: 50° C. | | | | | | | | | |
| (1) | 30 | 8 | 54 | 66 | 72 | 86 | 94 | 96 | 0.5 |

-continued

| Type of breaker | Quantity employed ppm | % separation of water after | | | | | | | % of residual water in the topped oil |
|---|---|---|---|---|---|---|---|---|---|
| | | 10' | 20' | 30' | 1$^h$ | 3$^h$ | 6$^h$ | 24$^h$ | |
| (2) | 30 | 18 | 60 | 74 | 78 | 92 | 94 | 98 | 0.2 |
| (3) | 30 | 20 | 62 | 76 | 80 | 92 | 96 | 98 | 0.2 |
| Blank value | — | 0 | 0 | 0 | 0 | 2 | 2 | 4 | — |

EXAMPLES 22 TO 24

The test emulsion was a crude oil from the foothill area of the Alps, which had been adjusted to a water content of 50% and a salinity of 0.50%.

Breaking temperature: 50° C.

| Type of breaker | Quantity employed ppm | % separation of water after | | | | | | | % of residual water in the topped oil |
|---|---|---|---|---|---|---|---|---|---|
| | | 10' | 20' | 30' | 1$^h$ | 3$^h$ | 6$^h$ | 24$^h$ | |
| (1) Crosslinked breaker according to German Patent 2,445,873 | 100 | 0 | 8 | 24 | 48 | 70 | 76 | 86 | 1.6 |
| (2) Breaker from Example 4 of the present application | 100 | 2 | 16 | 30 | 54 | 82 | 84 | 94 | 0.5 |
| (3) Breaker from Example 3 of the present application | 100 | 2 | 14 | 34 | 62 | 82 | 86 | 96 | 0.4 |
| (4) Breaker from Example 5 of the present application | 100 | 0 | 8 | 28 | 52 | 76 | 82 | 90 | 0.8 |
| Blank value | — | 0 | 0 | 0 | 0 | 2 | 2 | 3 | — |
| Breaking temperature: 50° | | | | | | | | | |
| (1) | 20 | 24 | 38 | 68 | 70 | 80 | 84 | 90 | 0.9 |
| (2) | 20 | 44 | 60 | 72 | 76 | 84 | 86 | 96 | 0.4 |
| (3) | 20 | 46 | 60 | 76 | 80 | 86 | 88 | 98 | 0.2 |
| (4) | 20 | 40 | 56 | 70 | 76 | 82 | 86 | 94 | 0.5 |
| Blank value | — | 0 | 0 | 0 | 2 | 2 | 3 | 6 | — |

EXAMPLES 25 TO 27

Crude oil emulsion from Lower Saxony

Water content: 43%.

Salinity: 6.8%.
Breaking temperature: 30° C.

Salinity: 10.2%.
Breaking temperature: 30° C.

| Type of breaker | Quantity employed ppm | % separation of water after | | | | | |
|---|---|---|---|---|---|---|---|
| | | 10' | 20' | 30' | 1$^h$ | 3$^h$ | 6$^h$ |
| Crosslinked breaker according to German Patent 2,445,873 | 20 | 4 | 12 | 40 | 58 | 68 | 90 |
| Component (a) from Example 4 of the present application | 20 | 0 | 0 | 0 | 0 | 2 | 4 |
| Component (b) from Example 4 of the present application | 20 | 0 | 1 | 8 | 12 | 24 | 32 |
| Breaker from Example 4 of the present application | 20 | 12 | 34 | 60 | 84 | 90 | 90 |
| Component (a) from Example 3 of the present application | 20 | 0 | 0 | 0 | 1 | 2 | 4 |
| Component (b) from Example 3 of the present application | 20 | 0 | 4 | 18 | 26 | 31 | 38 |
| Breaker from Example 3 of the present application | 20 | 16 | 48 | 80 | 90 | 96 | 98 |
| Component (a) from Example 5 of the present application | 20 | 0 | 0 | 0 | 0 | 1 | 2 |
| Component (b) from Example 5 of the present application | 20 | 0 | 4 | 16 | 24 | 30 | 36 |
| Breaker from Example 5 of the present application | 20 | 14 | 46 | 66 | 86 | 88 | 90 |
| Blank value | — | 0 | 0 | 0 | 0 | 0 | 0 |

EXAMPLES 28 TO 30

Crude oil emulsion from Saudi Arabia

Water content: 20.6%.

| Type of breaker | Quantity employed ppm | % separation of water after |||||||  % of residual water in the topped oil |
|---|---|---|---|---|---|---|---|---|---|
| | | 10' | 20' | 30' | 1$^h$ | 3$^h$ | 6$^h$ | 24$^h$ | |
| (1) Crosslinked breaker according to German Patent 2,445,873 | 100 | 0 | 0 | 2 | 4 | 28 | 80 | 86 | 2.0 |
| (2) Breaker from Example 8 of the present application | 100 | 0 | 1 | 4 | 8 | 36 | 92 | 96 | 0.4 |
| (3) Breaker from Example 9 of the present application | 100 | 0 | 1 | 8 | 12 | 80 | 92 | 96 | 0.3 |
| (4) Breaker from Example 10 of the present application | 100 | 0 | 2 | 4 | 10 | 84 | 92 | 96 | 0.4 |
| Blank value | — | 0 | 0 | 0 | 0 | 0 | 0 | 2 | — |
| Breaking temperature: 50° C. | | | | | | | | | |
| (1) | 20 | 2 | 4 | 10 | 16 | 48 | 66 | 86 | 2.0 |
| (2) | 20 | 0 | 0 | 1 | 8 | 60 | 80 | 92 | 0.6 |
| (3) | 20 | 6 | 60 | 72 | 90 | 96 | 98 | 98 | 0.2 |
| (4) | 20 | 0 | 0 | 1 | 86 | 96 | 98 | 98 | 0.2 |
| Blank value | — | 0 | 0 | 0 | 0 | 1 | 2 | 3 | — |

EXAMPLES 31 TO 33

The test emulsion was a crude oil from the foothill area of the Alps, which had been adjusted to a water content of 50% and a salinity of 0.5%.

Breaking temperature: 30° C.

EXAMPLES 34 TO 37

Crude oil emulsion from the Weser-Ems area

Water content: 58%.

Salinity: 3.4%.

Breaking temperature: 30° C.

| Type of breaker | Quantity employed ppm | % separation of water after |||||||  % of residual water in the topped oil |
|---|---|---|---|---|---|---|---|---|---|
| | | 10' | 20' | 30' | 1$^h$ | 3$^h$ | 6$^h$ | 24$^h$ | |
| (1) Breaker from Example 11 of the present application | 50 | 0 | 0 | 8 | 10 | 14 | 70 | 92 | 0.9 |
| (2) Components (a) + (b) mixed, from Example 11 of the present application | 50 | 0 | 0 | 0 | 2 | 8 | 14 | 20 | — |
| (3) Breaker from Example 12 of the present application | 50 | 0 | 2 | 8 | 12 | 16 | 76 | 94 | 0.6 |
| (4) Components (a) + (b) mixed, from Example 12 of the present application | 50 | 0 | 0 | 0 | 4 | 8 | 12 | 18 | — |
| (5) Breaker from Example 13 of the present application | 50 | 0 | 4 | 12 | 16 | 20 | 80 | 98 | 0.4 |
| (6) Components (a) + (b) mixed, from Example 13 of the present application | 50 | 0 | 0 | 0 | 4 | 10 | 14 | 18 | — |
| Blank value | — | 0 | 0 | 0 | 0 | 0 | 0 | 0 | — |
| Breaking temperature: 50° C. | | | | | | | | | |
| (1) | 20 | 32 | 38 | 54 | 70 | 82 | 100 | 100 | 0.1 |
| (2) | 20 | 0 | 0 | 2 | 8 | 14 | 20 | 26 | — |
| (3) | 20 | 40 | 44 | 58 | 74 | 90 | 100 | 100 | 0.1 |
| (4) | 20 | 0 | 0 | 2 | 10 | 16 | 20 | 28 | — |
| (5) | 20 | 46 | 50 | 64 | 76 | 96 | 100 | 100 | 0.1 |
| (6) | 20 | 0 | 0 | 0 | 8 | 14 | 18 | 26 | — |
| Blank value | — | 0 | 0 | 0 | 0 | 0 | 0 | — | — |

| Type of breaker | Quantity employed ppm | % separation of water after |||||||  % of residual water in the topped oil |
|---|---|---|---|---|---|---|---|---|---|
| | | 10' | 20' | 30' | 1$^h$ | 3$^h$ | 6$^h$ | 24$^h$ | |
| (1) Crosslinked breaker according to German Patent 2,445,873 | 100 | 0 | 2 | 6 | 46 | 62 | 74 | 88 | 1.8 |
| (2) Breaker from Example 12 of the present application | 100 | 4 | 12 | 22 | 44 | 68 | 84 | 94 | 0.6 |
| (3) Breaker from Example 14 of the present application | 100 | 2 | 10 | 18 | 44 | 66 | 84 | 92 | 0.8 |
| (4) Breaker from Example 16 of the present application | 100 | 0 | 12 | 34 | 76 | 98 | 98 | 100 | 0.1 |
| (5) Breaker from Example 17 of the present application | 100 | 0 | 1 | 10 | 28 | 92 | 96 | 98 | 0.3 |
| Blank value | — | 0 | 0 | 0 | 0 | 0 | 0 | 0 | — |
| Breaking temperature: 50° C. | | | | | | | | | |
| (1) | 20 | 18 | 28 | 38 | 68 | 76 | 88 | 90 | 0.9 |

-continued

| Type of breaker | Quantity employed ppm | % separation of water after | | | | | | | % of residual water in the topped oil |
|---|---|---|---|---|---|---|---|---|---|
| | | 10' | 20' | 30' | $1^h$ | $3^h$ | $6^h$ | $24^h$ | |
| (2) | 20 | 16 | 36 | 54 | 78 | 84 | 90 | 94 | 0.6 |
| (3) | 20 | 12 | 32 | 50 | 74 | 82 | 90 | 92 | 0.8 |
| (4) | 20 | 10 | 28 | 74 | 90 | 96 | 98 | 100 | 0.1 |
| (5) | 20 | 6 | 20 | 42 | 94 | 98 | 100 | 100 | 0.1 |
| Blank value | — | 0 | 0 | 0 | 0 | 2 | 2 | 4 | — |

We claim:

1. A petroleum emulsion breaker which has been prepared by reacting, at 90° to 160° C. and at a pH value of 6 to 9,
   (a) an addition product which has been obtained by reacting phenol with formaldehyde or acetaldehyde in a molar ratio of 1:1 to 3 at a temperature of 50° to 80° C., in the presence of an alkaline catalyst, with
   (b) a block polymer which contains nitrogen and which has been obtained by an addition reaction in which 10 to 80 moles of ethylene oxide and propylene oxide are added on, as a statistical average per nitrogen atom, the molar ratio of ethylene oxide to propylene oxide being 1:0.5 to 14, to ethylenediamine, propylenediamine, polyethylenepolyamines, polypropylenepolyamines or mixtures thereof,
the ratio being 1 to 20 moles of (a) and per mole of (b).

2. A petroleum emulsion breaker as claimed in claim 1, wherein the component (b) has been obtained by an addition reaction in which 30 to 70 moles of ethylene oxide and propylene oxide are added on, as a statistical average per nitrogen atom, the molar ratio of ethylene oxide to propylene oxide being 1:0.5 to 14.

3. A petroleum emulsion breaker as claimed in claim 1, wherein the molar ratio of ethylene oxide to propylene oxide is 1:1 to 8.

4. A petroleum emulsion breaker as claimed in claim 1, wherein the ethylene oxide and propylene oxide have been added on, by an addition reaction, to ethylenediamine, propylenediamine, diethylenetriamine, triethylenetetramine, tetraethylenepentamine, the corresponding propyleneamines and higher polyethylenepolyamines having a dynamic viscosity of up to 2,000 mPa s, determined on a 50% strength by weight aqueous solution at 20° C.

5. A petroleum emulsion breaker as claimed in claim 1, wherein the ethylene oxide and propylene oxide have been added on, by an addition reaction, to ethylenediamine, propylenediamine, diethylenetriamine, triethylenetetramine, tetraethylenepentamine and the corresponding propyleneamines.

6. A petroleum emulsion breaker as claimed in claim 1, wherein the components (a) and (b) are reacted in a ratio of 1 to 16 moles of (a) to 1 mole of (b).

7. A petroleum emulsion breaker as claimed in claim 1, wherein the components (a) and (b) are reacted at a temperature of 100° to 150° C.

8. A petroleum emulsion breaker as claimed in claim 1, wherein the components (a) and (b) are reacted at a pH value of 6.5 to 8.5.

9. A petroleum emulsion breaker as claimed in claim 1, which has been prepared by reacting, at 100° to 150° C. and at a pH value of 6.5 to 8.5,
   (a) an addition product which has been obtained by reacting phenol with formaldehyde or acetaldehyde in a molar ratio of 1:1.8 to 2.2 at a temperature of 55° to 70° C., in the presence of an alkaline catalyst, with
   (b) a block polymer which contains nitrogen and which has been obtained by an addition reaction in which 30 to 70 moles of ethylene oxide and propylene oxide are added on, as a statistical average per nitrogen atom, the molar ratio of ethylene oxide to propylene oxide being 1:1 to 8, to ethylenediamine, propylenediamine, diethylenetriamine, triethylenetetramine, tetraethylenepentamine and the corresponding propyleneamines,
the ratio being 1 to 16 moles of (a) to 1 mole of (b).

10. A petroleum emulsion breaker as claimed in claim 1, wherein the condensation product obtained in accordance with stages (a) and (b) is oxpropylated with 10 to 200 g of propylene oxide per 100 g of condensation product.

11. A process for separating petroleum emulsions, which comprises adding to the emulsions, in an amount of 5 to 100 g per metric ton, a petroleum emulsion breaker according to claim 1.

* * * * *